US011868356B2

(12) United States Patent
Sexton

(10) Patent No.: US 11,868,356 B2
(45) Date of Patent: Jan. 9, 2024

(54) SYSTEMS AND METHODS TO FACILITATE ENHANCED DOCUMENT RETRIEVAL IN ELECTRONIC DISCOVERY

(71) Applicant: JND HOLDINGS LLC, Seattle, WA (US)

(72) Inventor: Benjamin David Sexton, Stillwater, MN (US)

(73) Assignee: JND HOLDINGS LLC, Seattle, WA (US)

( * ) Notice: Subject to any disclaimer, the term of this patent is extended or adjusted under 35 U.S.C. 154(b) by 0 days.

(21) Appl. No.: 17/408,810

(22) Filed: Aug. 23, 2021

(65) Prior Publication Data

US 2022/0067056 A1 Mar. 3, 2022

Related U.S. Application Data

(60) Provisional application No. 63/070,088, filed on Aug. 25, 2020.

(51) Int. Cl.
| | |
|---|---|
| *G06F 16/2457* | (2019.01) |
| *G06F 16/93* | (2019.01) |
| *G06F 9/451* | (2018.01) |
| *G06F 16/248* | (2019.01) |

(52) U.S. Cl.
CPC ........ *G06F 16/24578* (2019.01); *G06F 9/451* (2018.02); *G06F 16/248* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 6,697,799 B1* | 2/2004 | Neal | ..... | G06F 16/951 |
| | | | | 707/999.01 |
| 7,814,085 B1 | 10/2010 | Ryger et al. | | |
| 10,459,938 B1* | 10/2019 | Agnew | ..... | G06F 16/26 |
| 2002/0099685 A1 | 7/2002 | Takano et al. | | |
| 2008/0077570 A1 | 3/2008 | Tang et al. | | |
| 2012/0221553 A1* | 8/2012 | Wittmer | ..... | G06F 16/904 |
| | | | | 707/E17.014 |
| 2012/0278244 A1* | 11/2012 | Lee | ..... | G06Q 50/184 |
| | | | | 705/310 |
| 2015/0310005 A1 | 10/2015 | Ryger et al. | | |
| 2015/0331585 A1 | 11/2015 | Stading et al. | | |

(Continued)

OTHER PUBLICATIONS

Gratzl, S.J. "Visually Guiding Users in Selection, Exploration, and Presentation Tasks," Doctoral Dissertation, Johannes Kepler University Linz, Institute of Computer Graphics, Mar. 2017, 49 pages.

(Continued)

*Primary Examiner* — Kannan Shanmugasundaram
(74) *Attorney, Agent, or Firm* — Davis Wright Tremaine LLP; George C. Rondeau, Jr.; Heather M. Colburn

(57) ABSTRACT

A method that includes obtaining results from multiple operations (e.g., searches) for a plurality of items (e.g., documents), determining a composite score for each of the plurality of items based on those of the results obtained for the item, and displaying information related to the composite score obtained for at least a portion of the plurality of items in a graphical user interface.

35 Claims, 8 Drawing Sheets

(56) References Cited

U.S. PATENT DOCUMENTS

2019/0188295 A1* 6/2019 Sirotkovic ............ G06F 16/313

OTHER PUBLICATIONS

International Search Report and Written Opinion, dated Nov. 30, 2021, received in International Application No. PCT/US2021/047214.
Papers Genius: "Creating Books and Book Chapters in Papers," Mar. 24, 2011 Retrieved from the Internet: URL: https://www.youtube.com/watch?v=WOzbaVP6XaM [Retrieved on Jun. 5, 2023].
Sharepoint Rackspace: "SharePoint 2013: How to edit a list or library using Quick Edit," Oct. 10, 2024 Retrieved from the Internet: URL: https://www.youtube.com/watch?v=foZxcFC1k80 [Retrieved on Jun. 5, 2023].
Sharepoint Rackspace: "SharePoint 2013: How to edit a list or library using Quick Edit," Oct. 10, 2014 Retrieved from the Internet: URL: https://www.youtube.com/watch?v=foZxcFC1k80 [Retrieved on Jun. 5, 2023].

* cited by examiner

SEARCH RESULTS

| CONTROL NUMBER | COMPOSITE SCORE | EXACT RANK | FUZZY RANK | STEMMING RANK | CONCEPT RANK | COGNITIVE RANK |
|---|---|---|---|---|---|---|
| EML00000067802 | 491 | 100 | 100 | 100 | 91 | 100 |
| EML00000025114 | 484 | 100 | 100 | 100 | 84 | 100 |
| EML00000078445 | 483 | 100 | 100 | 100 | 83 | 100 |
| EML00000072147 | 483 | 100 | 100 | 100 | 83 | 100 |
| EML00000045297 | 483 | 100 | 100 | 100 | 83 | 100 |
| EML00000001857 | 481 | 100 | 100 | 100 | 81 | 100 |
| EML00000013505 | 481 | 100 | 100 | 100 | 81 | 100 |
| EML00000068033 | 481 | 100 | 100 | 100 | 81 | 100 |
| EML00000003970 | 480 | 100 | 100 | 100 | 80 | 100 |
| EML00000021625 | 480 | 100 | 100 | 100 | 80 | 100 |

ROWS PER PAGE: 10 ▽   1-10 OF 20434

FIG. 3

SYSTEMS AND METHODS TO FACILITATE ENHANCED DOCUMENT RETRIEVAL IN ELECTRONIC DISCOVERY

CROSS REFERENCE TO RELATED APPLICATION

This application claims the benefit of U.S. Provisional Patent Application No. 63/070,088, filed on Aug. 25, 2020, which is incorporated herein by reference in its entirety.

BACKGROUND

Technical Field

The present invention is directed generally to methods of identifying relevant documents within a document corpus.

Description of the Related Art

Electronic Discovery ("E-Discovery") is a field that addresses the identification and production of electronic evidence (referred to as "documents") relevant to a digital investigation or litigation. The process of identifying documents relevant to a legal dispute typically involves three phases:
1. A document collection phase during which documents are harvested from information systems and/or a source media and indexed in a searchable database to establish a document corpus;
2. An Early Case Assessment ("ECA:") phase during which queries and analytic operations are run against the document corpus to eliminate irrelevant documents and narrow the population to a potentially relevant document universe prior to a human review phase; and
3. A human review phase during which attorneys make human determinations as to the relevance of each document in the potentially relevant document universe.

Mounting document corpora has made human review increasingly time consuming and costly. Each relevance determination made by an attorney through human review costs approximately $1.25, based on industry averages. In a modern litigation, initial corpora regularly exceed 10 million ("MM") potentially relevant documents, of which less than 1% are often deemed relevant. Because of the significant time and cost associated with manually reviewing each document during the human review phase, accurate and efficient methods of automated document retrieval are of critical value.

Various document retrieval methods have been established for identifying a subset of documents, referred to as "priority documents," that require human review. Such document retrieval methods include keyword searching, fuzzy searching, stemming searching, concept searching, and cognitive searching. Most document retrieval methods result in a binary classification (positive or negative) and, as a result, may be validated (or invalidated) through statistical sampling to estimate a recall rate and a precision value for the results.

A perfect E-Discovery document retrieval model would identify all relevant documents within the larger corpus (or have a recall rate=1.0) without generating any false positives (or have a precision value=1.0). In such a scenario, attorneys would not be required to review any irrelevant documents, resulting in maximum time and cost savings.

BRIEF DESCRIPTION OF THE SEVERAL VIEWS OF THE DRAWINGS

Various embodiments in accordance with the present disclosure will be described with reference to the following drawings.

FIG. 3 is an illustration of a graphical user interface displaying at least a subset of search results in a document list that displays a Composite Score for each document in the document list.

Like reference numerals have been used in the figures to identify like components.

DETAILED DESCRIPTION

Electronic evidence is referred to herein as being one or more "documents." However, such electronic evidence need not be a conventional document and includes other types of evidence produced during discovery, such as electronic documents, electronic mail ("email"), text messages, electronic records, contracts, audio recordings, voice messages, video recordings, digital images, digital models, physical models, a structured data set, an unstructured data set, and the like. One or more documents may be identified by one or more document identifying operations, referred to herein as searches or queries. In other words, the documents may be searchable by a plurality of searching methods, such as keyword or exact searching, fuzzy searching, stemming searching, conceptual searching, and cognitive searching. When a document is identified by one or more searches, that document is a positive value or a "hit" with respect to the document identifying operation(s).

The disclosed embodiments provide a set of methods, systems, and data structures to query for and rank documents based on their relevance to a legal matter. Document rank is calculated based on a composite of scores provided by a plurality of search providers.

Most commercially available document retrieval technologies deliver results in a binary format, in that each document is either identified (e.g., positive) or not identified (e.g., negative) by a particular document identifying operation (e.g., a search). Generally, each search method or document identifying operation delivers a unique set of results to a user. Thus, when multiple searches or document identifying operations are performed, the user will receive multiple sets of results. Then, the user reviews each set of results independently one at a time.

Unfortunately, currently available technologies do not effectively coordinate results across a growing array of document retrieval methodologies into a single user interface and/or provide a comprehensive scoring system. In contrast, a method 900 (see FIG. 9) coordinates results across multiple document retrieval systems to accelerate the process of identifying relevant documents. Further, the method 900 (see FIG. 9) may be configured to perform multiple searches (e.g., using multiple document retrieval systems) at the same time.

Figure 10:
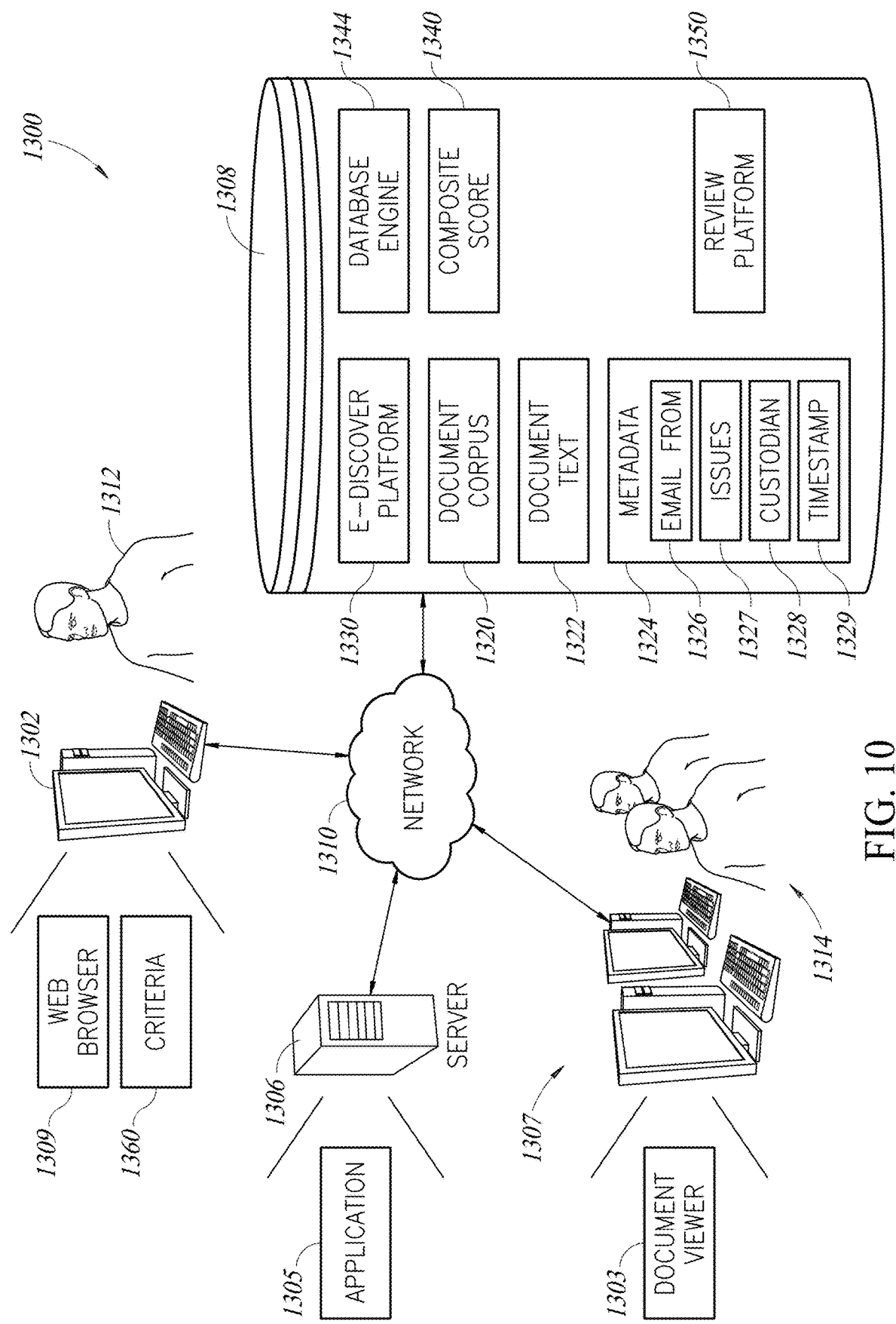
FIG. 10 is a block diagram of a system configured to perform the method of FIG. 9.

By way of non-limiting examples, referring to FIG. 10, document identifying operations may include one or more of the following search methods.

1. Exact Search: A keyword-based query or search that is run against an indexed database (e.g., searchable database 1308) of text (e.g., extracted document text 1322). The user inputs a string of text into a user interface, and the search engine (e.g., database engine 1344) retrieves documents that contain exact matches for the string of text entered by the user. For example, an exact search for the word "harass" would retrieve documents containing the exact word "harass."
2. Fuzzy Search: A keyword-based query or search that is run against an indexed database (e.g., the searchable database 1308) of text (e.g., the extracted document text 1322). The user inputs a string of text into the user interface, and the search engine (e.g., database engine 1344) retrieves documents that contain exact matches for the string of text entered by the user, as well as slight variations of the string of text, such as typographical errors. For example, a fuzzy search for the term "harass" may retrieve documents containing the exact term "harass" as well as the term "hurass."
3. Stemming Search: A keyword-based query run against an indexed database of text. The user inputs a string of text into the user interface, and the search engine retrieves documents that contain exact matches for the string of text entered by the user, as well as instances where the string of text is included in a longer string, often due to a suffix. For example, a stemming search for the term "harass" would retrieve documents containing the term "harassment" and the term "harassed."
4. Concept Search: A string of text is submitted as query criteria that is used to search a conceptual search index, usually generated through a form of Latent Semantic Indexing. Documents containing terms that often appear in similar contexts to the query criteria are retrieved and returned as search results. For example, a document containing the terms "software development agreement" may be a positive result for a concept search for "contract engagement design."
5. Cognitive Search: A string of text is submitted as query criteria that is used to search a conceptual search index. Documents that are topically related to or contain terms that share similar meaning to the query criteria are retrieved and returned as search results. For example, a document containing the terms "gender," "uncomfortable," or "embarrass" may be positive results for a cognitive search for the term "harass."

Figure 2:
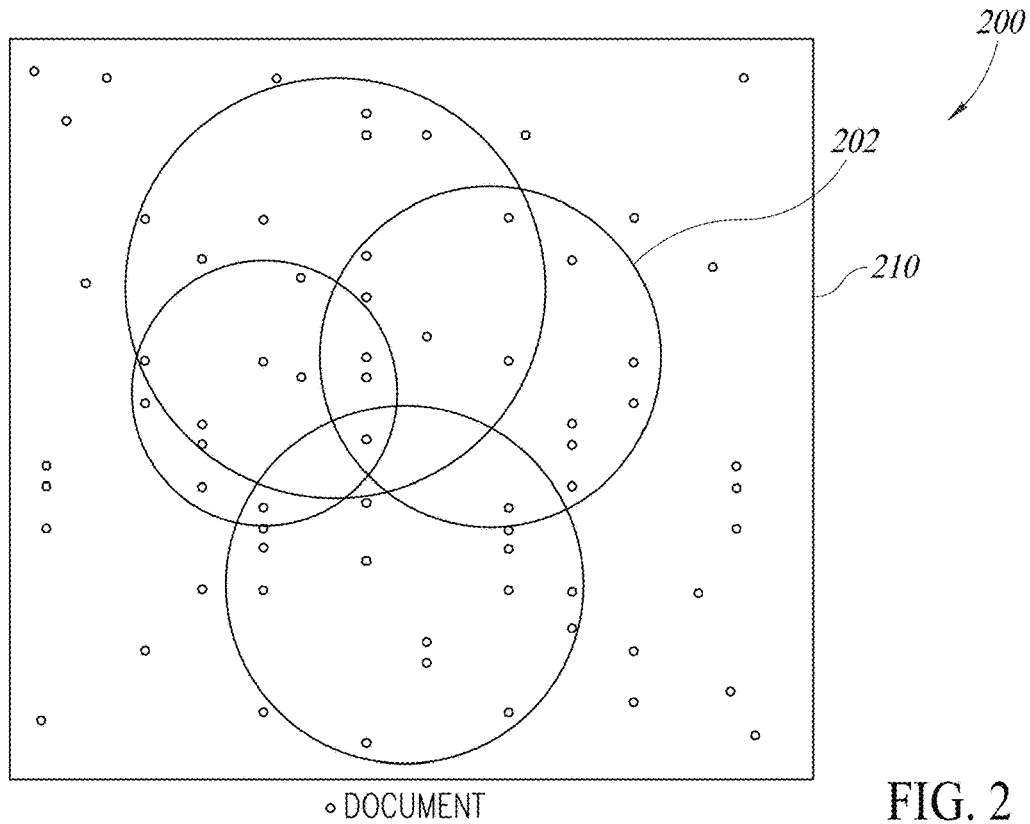
FIG. 2 illustrates a Venn diagram depicting results obtained from multiple searches performed on an example document corpus.

A typical search scenario will now be described for illustrative purposes. FIG. 2 illustrates a Venn diagram 200 that includes circles or rings 202 that each represent results obtained from a different document identifying operation performed on an example document corpus 210. Thus, the Venn diagram 200 depicts results obtained from multiple document identifying operations (e.g., searches) performed on the document corpus 210, which was collected during the document collection phase.

In this example, one million documents were collected during the document collection phase. Thus, the document corpus 210 includes one million documents. During the ECA phase, an investigator performed document identifying operations on the document corpus 210 to identify evidence relevant to evaluating a claim of workplace harassment. In this example, the investigator ran the following searches:

A. An Exact Search for the term "Harass," which identified 1,000 Documents;
B. A Fuzzy Search for the term "Harass" which identified 1,500 Documents;
C. A Stemming Search for the term "Harass" which identified 2,000 Documents;
D. A Concept Search for the term "Harass" which identified 500 Documents; and
E. A Cognitive Search for the term "Harass" which identified 10,000 Documents The above searches identified a total of 14,700 unique documents or "search hits." Thus, 300 documents were identified in two or more of the searches. Of the 14,700 search hits, the investigator estimates there may be less than 20 documents that are actually relevant to this investigation. Traditionally, to locate the 20 relevant documents, the investigator might set out to review all 14,700 search hits identified by the five search methods.

Figure 9:
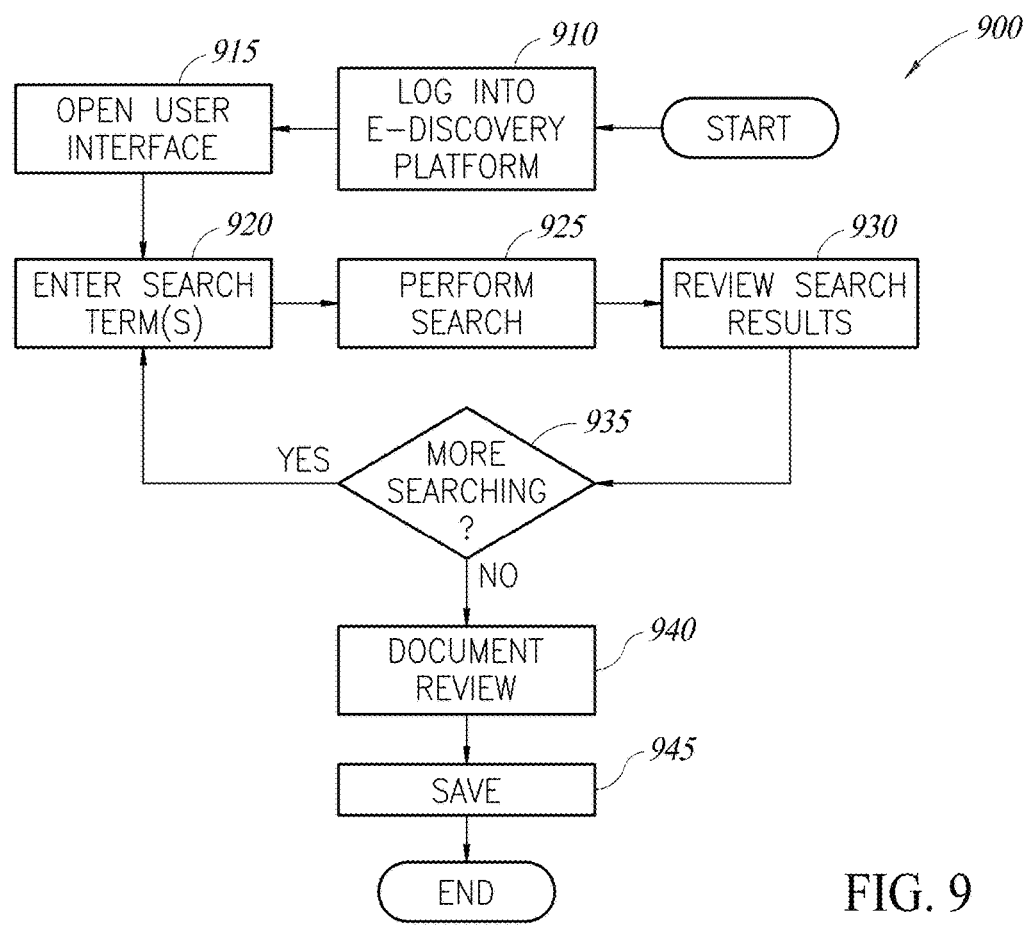
FIG. 9 is a flow diagram of the method.

Referring to FIG. 9, instead of delivering a set of binary results for each of five separate search methods, the method 900 delivers a single set of results for all five search methods, and calculates a single Composite Score for each document, indicating a priority ranking for review. A document that is responsive to multiple document search methods is more likely to be a true positive hit than documents that hit on only one search method. For example, a document that contains the four terms "harass," "harassment," "embarrass," and "human resources" is likely more relevant to the evaluation of the claim of workplace harassment than a document that contains only one of these four terms. Using the method 900, the 300 documents that were identified by multiple search types are assigned a higher composite score than the remaining 14,700, and they are escalate to the top of the review queue.

As mentioned above, a Composite Score is calculated for each document and indicates its priority ranking for review. To calculate this priority ranking for each document, the method 900 sums the individual search ranking obtained for the document for each search method and assigns a Composite Score to the document based on the sum. The individual search rankings are based on the number of queries for which each document is a positive result, and the document's ranking within each independent query. Using the method 900, the 20 relevant documents are more likely to be promoted to the top of the search results and to be assigned a high Composite Score than by using any one individual search method.

The method 900 presents the investigator with a populated dashboard user interface 600 (see FIG. 6) that includes interactive charts, such as a Sankey Chart 610B, a Timeline chart 700 (see FIG. 7), a Histogram (not shown), and/or other interactive graphs and charts, that allow the investigator to quickly drill in on key subsets of the search results that are of the highest relevance to the investigation. Along with the interactive charts, referring to FIG. 3, the investigator is presented with a document list 310A of search hits (e.g., displayed in a grid display), revealing the Composite Score for each document (e.g., ranked from high to low).

Referring to FIG. 9, the method 900 may be an improvement over the traditional method in one or more of the following four ways:

1.) The method 900 allows a plurality of search methods to be executed in unison rather than in series;
2.) The method 900 returns a single set of results to the user instead of multiple sets of binary "good pile" results and/or "bad pile" results;
3.) The method 900 universally ranks each document based on a Composite Score; and
4.) The method 900 allows the user to quickly identify (e.g., using the Sankey Chart 610B and other charts) key pockets of documents within the search results identified by multiple search methods, which may not have otherwise been discovered.

Setup—Database Preparation

Figure 4:
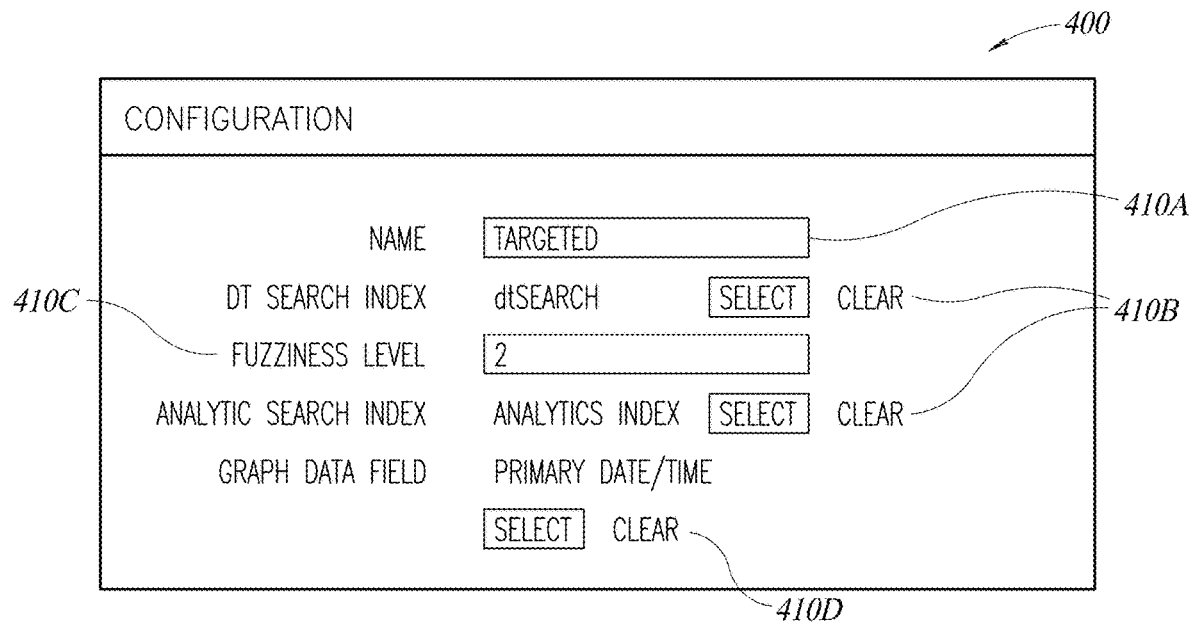
FIG. 4 is an illustration of a graphical user interface displaying a Search Configuration User Interface.

Text may be extracted from the documents stored in a document corpus 1320 (e.g., the extracted document text 1322 illustrated in FIG. 10) and stored in the searchable database 1308 (see FIG. 10). The searchable database 1308 is equipped to facilitate document retrieval through standard querying methodologies against the extracted document text 1322. When an application 1305 is installed (e.g., in a server 1306), the system 1300 is configured to generate a dashboard user interface (e.g. the populated dashboard user interface 600 illustrated in FIG. 6) and a search configuration user interface 400 (see FIG. 4) that are made available to the user. The search configuration user interface 400 includes a configuration profile name input 410A, at least one search input selection input 410B, a fuzziness level input 410C, and a data field for timeline input 410D. The inputs 410A-410D are used to configure a search.

Setup—Configuration

After installing the application 1305 (e.g., on the server 1306), the user 1312 uses the search configuration user interface 400 to configure a profile (e.g., a profile named "Target") to use for searching. A name of the profile may be entered in the configuration profile name input 410A. The profile may define any relevant search parameters, including the following information:

Which search methods will be utilized
Which keyword search indexes should be used
Which analytics search indexes should be used
The default level of fuzzy search (0-10)
Which date field should be used to plot search hits against a timeline By way of non-limiting examples, which search indexes will be used may be entered into the search input selection input(s) 410B. The default level of fuzzy search may be entered into the fuzziness level input 410C. The date field to be used to plot the search hits may be entered into the data field for timeline input 410D.

Setup—Initial Unpopulated Dashboard

Figure 5:
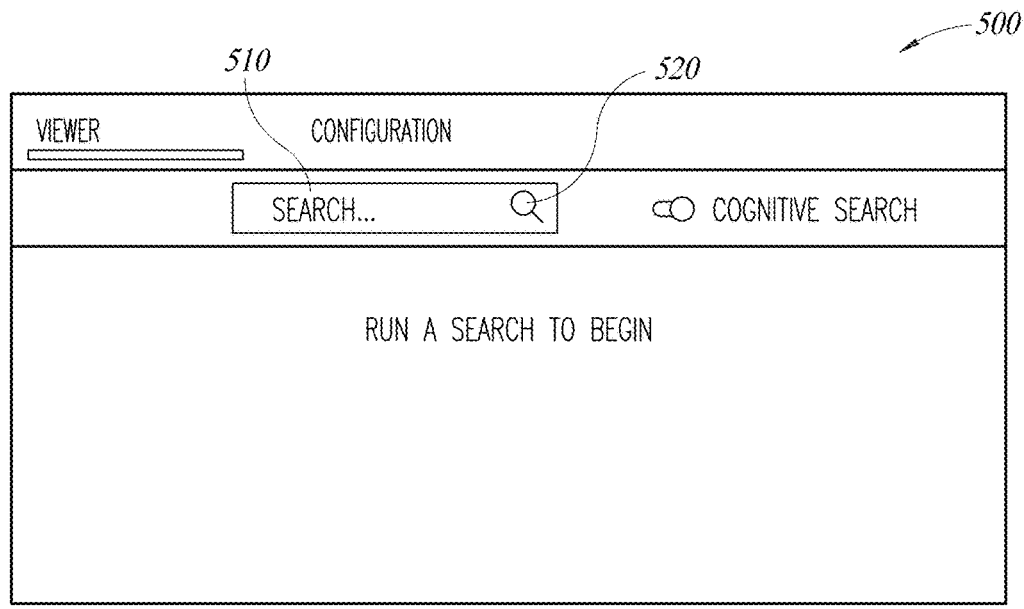
FIG. 5 is an illustration of a graphical user interface displaying a dashboard interface before the dashboard interface is populated with search results.
Figure 6:
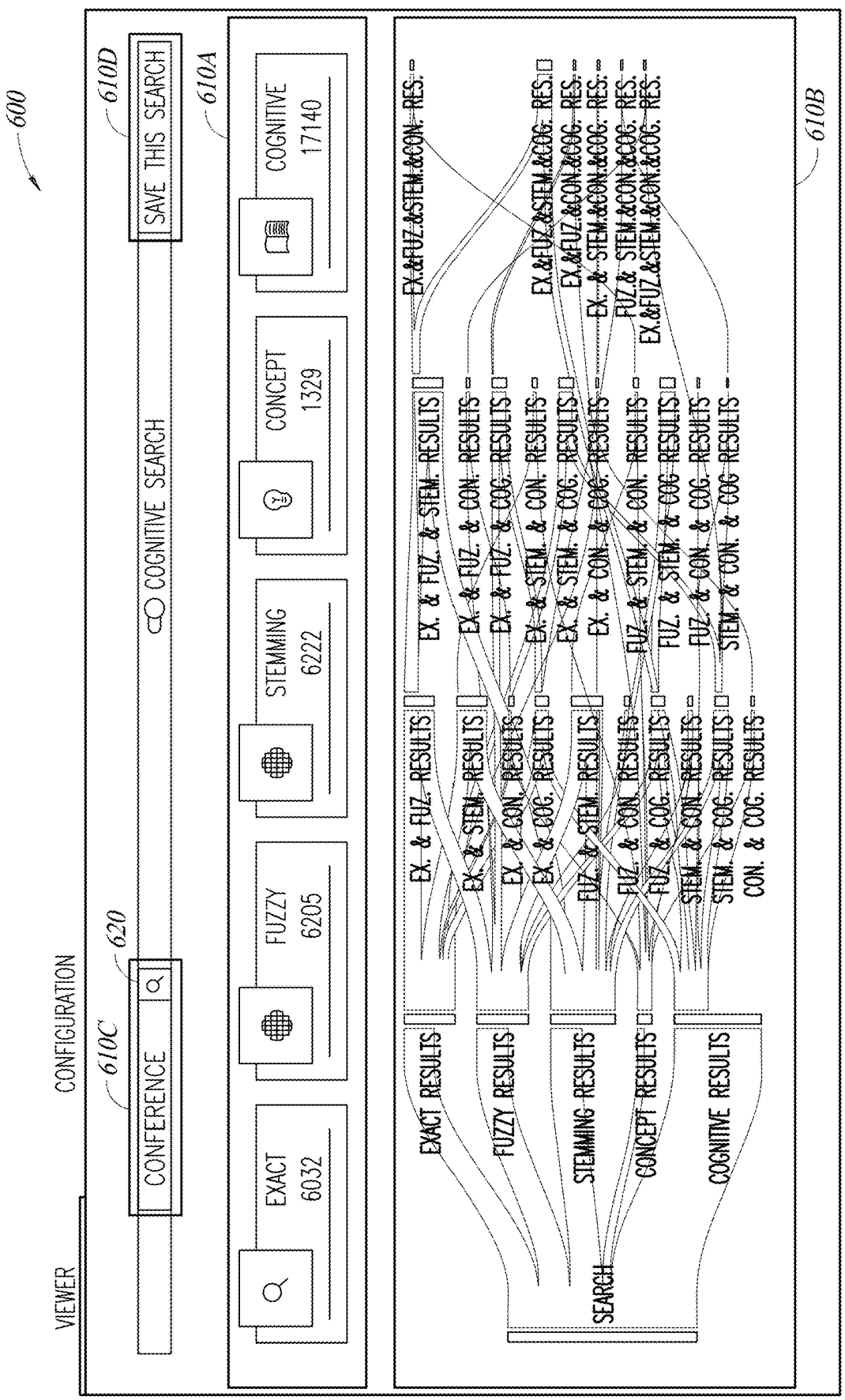
FIG. 6 is an illustration of the dashboard interface of FIG. 5 populated with search results.
Figure 7:
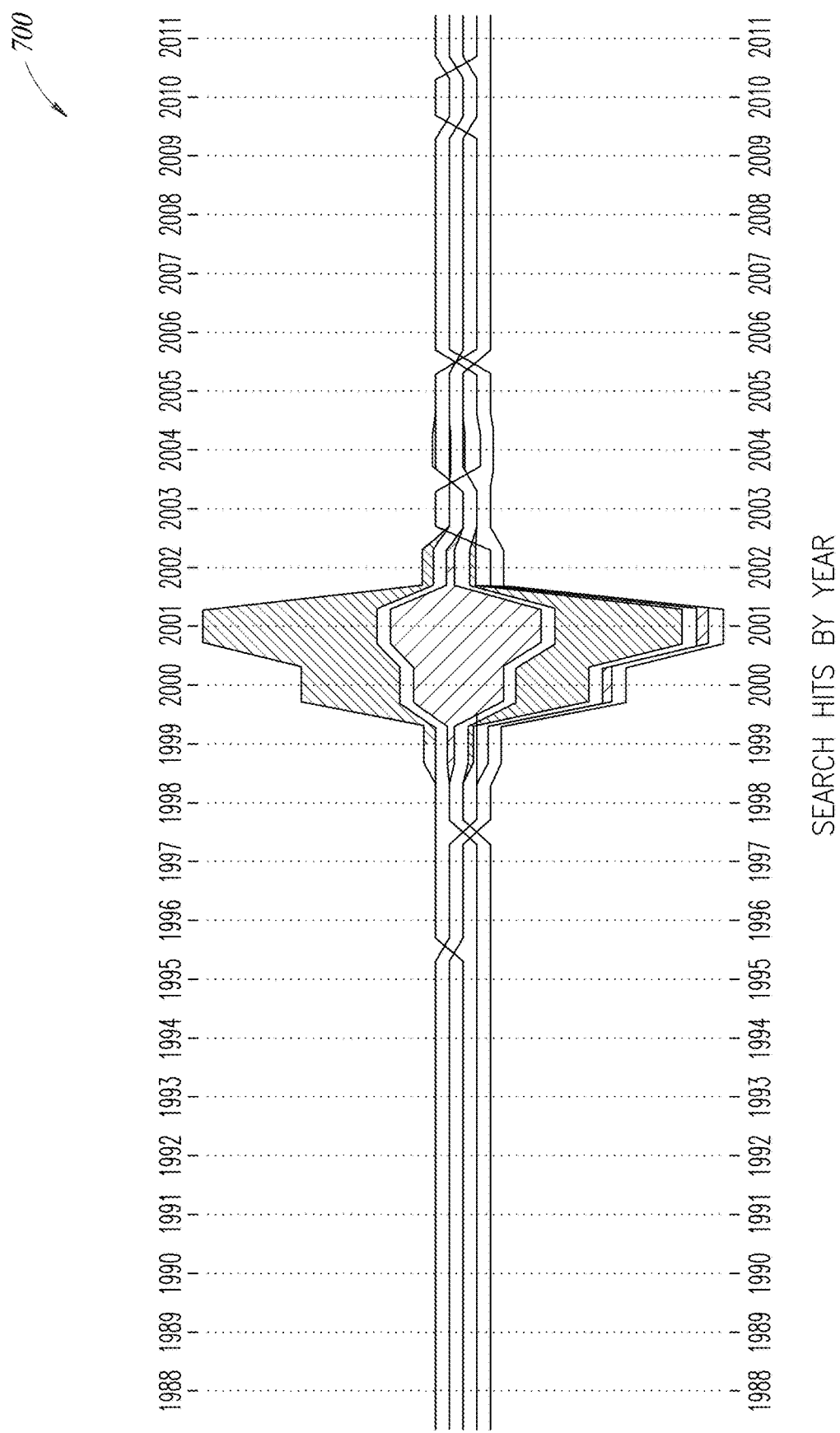
FIG. 7 is an illustration of a graphical user interface displaying a Timeline Chart.

After the application 1305 is installed, referring to FIG. 5, an unpopulated dashboard user interface 500 is displayed to the user. FIG. 5 illustrates the unpopulated dashboard user interface 500 before any searches have been performed. Prior to running a search, the unpopulated dashboard user interface 500 is unpopulated with results. FIG. 6 illustrates the unpopulated dashboard user interface 500 after searches have been performed and the dashboard user interface 600 is populated with results. As shown in FIG. 6, the populated dashboard user interface 600 may include interactive Hypertext Markup Language ("HTML") based graphics representing various search methods, as well as the document list 310A (see FIG. 3) displaying the search results.

Performing a Query

To perform a query on the document corpus 1320 (see FIG. 10), the user 1312 (see FIG. 10) selects one or more search terms (e.g., a keyword or topic), such as the term "contraband," for which the user 1312 (see FIG. 10) wishes to search. The user 1312 (see FIG. 10) inputs the search term(s) (e.g., into a search bar 610C), and selects a user input 620 (e.g., presses a button "Enter" using the keyboard or clicks a search icon or link "Search" using their mouse) to initiate the search. Using the search term(s), a plurality of search methods are run in parallel against the document corpus 1320.

The search results are presented to the user 1312 in the form of a graphical user interface that includes the populated dashboard user interface 600 and the document list 310A. The populated dashboard user interface 600 includes a variety of interactive charts and graphs, allowing the user 1312 to visually navigate the search results. Initially, the document list 310A displays search hits from all search queries, sorted from high to low according to their Composite Scores.

The document list 310A can then be filtered and sorted by the user 1312 to further explore the search results. For example, the user 1312 may use the populated dashboard user interface 600 to review documents that are hits for only the conceptual and cognitive searches, with a ranking of 90% or higher, excluding any exact, verbatim matches.

The method 900 (see FIG. 9) does not make any requirements of the document retrieval method applied by the software operator (e.g., the user 1312), other than that the results must be a binary (e.g., positive and negative) classification. The method 900 uses results from known document retrieval methods, which are commercially available in several products, collectively referred to henceforth as an E-Discovery Platform 1330. The application 1305 is configured to interact with the E-Discovery Platform 1330 and direct its operations.

FIG. 9 is a flow diagram of the method 900 that may be performed by a system 1300 (see FIG. 10). In first block 910, the operator (e.g., the user 1312) logs into the E-Discovery Platform 1330 (see FIG. 10). Then, in block 915, the operator indicates to the application 1305 (see FIG. 10) that the operator would like to open the unpopulated dashboard user interface 500 (see FIG. 5). In response, the application 1305 instructs the client computing device 1302 to display the unpopulated dashboard user interface 500. In block 920, the operator (e.g., the user 1312) enters one or more search terms into an editable user input 510 (e.g., the search bar 610C), and submits the search to the application 1305 by selecting a search user input 520 (e.g., pressing an "Enter" button or clicking a "Search" icon or link).

In block 925, the application 1305 directs the E-Discovery Platform 1330 to simultaneously perform a plurality of different searches for the search term(s) entered in block 920. The E-Discovery Platform 1330 returns the search results to the application 1305, which instructs the client computing device 1302 to display the search results in one or more interactive graphical displays (e.g., the populated dashboard user interface 600 depicted in FIG. 6), such as the Sankey Chart 6106 (see FIG. 6).

Then, in block 930, the operator (e.g., the user 1312) reviews the search results displayed in the interactive graphical display(s) and selects a subset of the documents included in the search results. In other words, in block 930, the operator may filter the search results by selecting documents believed to be particularly relevant. As shown in FIG. 6, the Sankey Chart 6106 may include multiple streams each representing a different subset of the documents. The operator may click on a specific stream in the Sankey Chart 6106 to filter the search results (which also filters the document list 310A) to include high priority documents returned by multiple searches. After using the populated dashboard user interface 600 to identify an important subset of the search results for review, the operator may scroll to the document list 310A, which includes only the subset. The document list 310A may display the highest ranked documents, according to the Composite Score, at the top of the document list 310A. The operator may choose to further filter the document list 310A by including and excluding specific search methods. A description of how the Composite Scores are calculated is provided below. The operator communicates the subset to the application 1305.

After the operator selects the subset of the documents for review by the document review team 1314 during the human review phase, in block 940, the operator may select (e.g., click on) a user input (e.g., a link) provided in the document list 310A to initiate the human review phase. The operator may use forward and backward navigation to advance a member of the document review team 1314 between different search results.

After the human review phase is completed, or at any stage after a search has been performed, in block 945, the operator (e.g., the user 1312) may save the search results for future reference. To save a search result, the operator may select a user input 610D (e.g., click on a "Save Search" button), which communicates the operator's desire to save the search results to the application 1305. The application 1305 communicates this information to the E-Discovery Platform 1330 (see FIG. 10). In response, the E-Discovery Platform 1330 (see FIG. 10) saves the search results. When saving the search results, the E-Discovery Platform 1330 (see FIG. 10) stores the search criteria, search results, and the Composite Scores obtained for the documents returned by the search. Then, the method 900 terminates.

Composite Score Calculation

After the user submits a query, in block 925, the following operations are executed by the database engine 1344 (e.g., Microsoft SQL).

The Composite Score field 1340 is updated for all search results according to Equation 1 below in which, for each document, a variable "CR" represents the Composite Score and variables "$SR_i$" represent a ranking of the document within a particular search:

$$CR = SR_1 + SR_2 + SR_3 + [\ldots] + SR_n \qquad \text{Equation 1}$$

For each document, the variables "$SR_1$," "$SR_2$," "$SR_3$," . . . "$SR_n$," represent the rank of the document in each of a number "n" of searches. Each of the searches may have been conducted using a different search method.

By way of an illustrative example, Table A below lists an example document corpus that contains five documents, assigned Control Numbers 1-5. Prior to the execution of a search, the documents are each assigned a Composite Score of zero.

TABLE A

| Control No. | Composite Score |
|---|---|
| 1 | 0 |
| 2 | 0 |
| 3 | 0 |
| 4 | 0 |
| 5 | 0 |

Referring to FIG. 9, after the operator performs blocks 910 and 915, in block 920 (see FIG. 9), the operator enters the search term "contraband." Then, in block 925 (see FIG. 9), E-Discovery Platform 1330 (see FIG. 10) performs the plurality of searches in unison. By way of non-limiting examples, the plurality of searches may include an exact search, a fuzzy search, a stemming search, a conceptual search, and a cognitive search each for the term "contraband." For the sake of this example, the maximum possible ranking for each search is 100. Table B below lists example ranks assigned to each of the documents in the document corpus of Table A above. This, in this example, each document has a value for the variables "$SR_1$," "$SR_2$," "$SR_3$," "$SR_4$," and "$SR_5$" that represents the ranking of the document in the exact search, the fuzzy search, the stemming search, the conceptual search, and the cognitive search, respectively, illustrated in columns 2-5 of the Table B below. For each document, the rightmost column lists the value of the variable "CR" obtained using the Equation 1 above. In other words, the Composite Score obtained for each document is list in rightmost column of the Table B below.

TABLE B

| Control No. | Exact | Fuzzy | Stemming | Conceptual | Cognitive | Composite Score |
|---|---|---|---|---|---|---|
| 1 | 100 | 100 | 100 | 100 | 100 | 500 |
| 2 | 0 | 0 | 0 | 0 | 0 | 0 |
| 3 | 0 | 90 | 0 | 80 | 100 | 270 |
| 4 | 100 | 0 | 0 | 0 | 0 | 100 |
| 5 | 0 | 0 | 0 | 100 | 50 | 150 |

The document assigned Control Number 1 was returned by all of the searches and was assigned a rank of 100 for each of the searches. Therefore, the document assigned Control Number 1 is a perfect match for all search providers, and achieved a maximum possible Composite Score of 500.

The document assigned Control Number 2 was not returned by any of the five search methods. Therefore, the document assigned Control Number 2 was assigned a rank of zero for each of the searches and a Composite Score of zero.

The document assigned Control Number 3 was not returned by the exact or stemming searches, but did contain a 90 match for the fuzzy search, an 80 match for the conceptual search, and a 100 match for the cognitive search. Thus, the document assigned Control Number 3 was assigned a rank of 90 for the fuzzy search, a rank of 80 for the conceptual search, a rank of 100 for the cognitive search, and a rank of zero for the other searches. Therefore, the document assigned Control Number 3 was assigned a Composite Score of 270.

The document assigned Control Number 4 was returned by only the exact search. Thus, the document assigned Control Number 4 contained an exact match for the term and did not hit on any other search methods. The document assigned Control Number 4 was assigned a rank of 100 for the exact search and a rank of zero for the other searches. Therefore, the document assigned Control Number 4 was assigned a Composite Score of 100.

The document assigned Control Number 5 hit on the conceptual search with rank of 100, and the cognitive search with rank of 50. The document assigned Control Number 5 was assigned a rank of zero for the other searches. Therefore, the document assigned Control Number 5 was assigned a Composite Score of 150.

Then, in block 930, the search results are presented to the operator in the document list 310A (see FIG. 3). For each document, the document list 310A displays the document's control number (in the leftmost column), rank for each of the plurality of searches (in the five rightmost columns), and the Composite Score 3108 (in the column to the right of the column with the control numbers). However, referring to Table C below, the document assigned the Control Number 2 may not be displayed to the operator in the document list 310A, as it was not a positive hit for any of the five search types.

TABLE C

| Control No. | Exact | Fuzzy | Stemming | Conceptual | Cognitive | Composite Score |
|---|---|---|---|---|---|---|
| 1 | 100 | 100 | 100 | 100 | 100 | 500 |
| 3 | 0 | 90 | 0 | 80 | 100 | 270 |
| 5 | 0 | 0 | 0 | 100 | 50 | 150 |
| 4 | 100 | 0 | 0 | 0 | 0 | 100 |
| 2 | 0 | 0 | 0 | 0 | 0 | 0 |

Statistical Validation

The method 900 (see FIG. 9) accelerates the traditional E-Discovery workflow by eliminating irrelevant documents from the document corpus 1320 prior to the human review phase. In other words, the document corpus 1320 is classified into a positive set and a negative set. The positive set includes each document assigned a Composite Score that is sufficiently high enough to signify the document requires human review. On the other hand, the negative set includes each document assigned a Composite Score that is sufficiently low enough to signify the document does not require human review. Because each document is classified into one of two sets, the method 900 (see FIG. 9) generates a binary classification.

After the method 900 terminates and before the human review phase, a statistical validation method may be performed to ensure that a reasonably high percentage of relevant documents have been identified. For example, an $F_1$ Score is a metric calculated using both the recall rate and the precision value. Measuring the recall rate and the precision value is an industry standard methodology used to validate a binary classification.

Referring to FIG. 10, to calculate the $F_1$ Score the user 1312 may use the E-Discovery Platform 1330 to open the target document corpus 1320. Then, the user 1312 uses the E-Discovery Platform 1330 to run a random sampling operation and retrieve a random subset of the document corpus 1320. The number of documents in the sample population can be determined by the user 1312 based on desired inputs for Confidence Level and Margin of Error according to standard Bell Curve guidelines for a random sampling from a binary population.

Next, the user 1312 performs a human review of each sampled document, and determines whether each document is relevant or irrelevant to the investigation. These determinations will be referred to as being human relevance determinations. The user may assign a Relevance Weight determination to each document that functions as the human relevance determination for that document. Documents assigned a Relevance Weight that is greater than or equal to a threshold value may be considered relevant and documents assigned a Relevance Weight that is less than the threshold value may be considered not relevant. If the documents are being reviewed by more than one reviewer, the Relevance Weights assigned to each document may be aggregated (e.g., averaged, totaled, and the like) before the aggregated value is compared to the threshold value.

As mentioned above, the Composite Scores may be used to determine which documents the method 900 (see FIG. 9) determined are relevant and which are documents irrelevant to the investigation. For example, documents assigned a Composite Score greater than or equal to a threshold value may be considered relevant and documents assigned a Composite Score less than the threshold value may be considered irrelevant. These determinations will be referred to as being Composite Score relevance determinations. The threshold value may be determined by the operator. Alternatively, the database engine 1344 may automatically set the threshold value. Then, the E-Discovery Platform 1330 uses the human relevance determinations and the Composite Score relevance determinations to determine whether each document was a true positive (meaning the document was correctly identified as being relevant by the Composite Score relevance determination), a true negative (meaning the document was correctly identified as being irrelevant by the Composite Score relevance determination), a false positive (meaning the document was incorrectly identified as being relevant by the Composite Score relevance determination), and a false negative (meaning the document was incorrectly identified as being irrelevant by the Composite Score relevance determination). Then, the E-Discovery Platform 1330 sums the documents to obtain the following values:

1.) True Positives (represented by a variable "$T_P$"), which is a total count of the documents that the Composite Score relevance determinations and the human relevance determinations agree are relevant.
2.) True Negatives (represented by a variable "$T_N$"), which is a total count of the documents that the Composite Score relevance determinations and the human relevance determinations agree are not relevant.
3.) False Positives (represented by a variable "$F_P$"), which is a total count of the documents that the Composite Score relevance determinations determined are relevant (or belong to the positive set), but the human relevance determinations found are not relevant.
4.) False Negatives (represented by a variable "$F_N$"), which is a total count of the documents that the Composite Score relevance determinations determined are not relevant (or belong to the negative set), but the human relevance determinations found are relevant.

Figure 1:
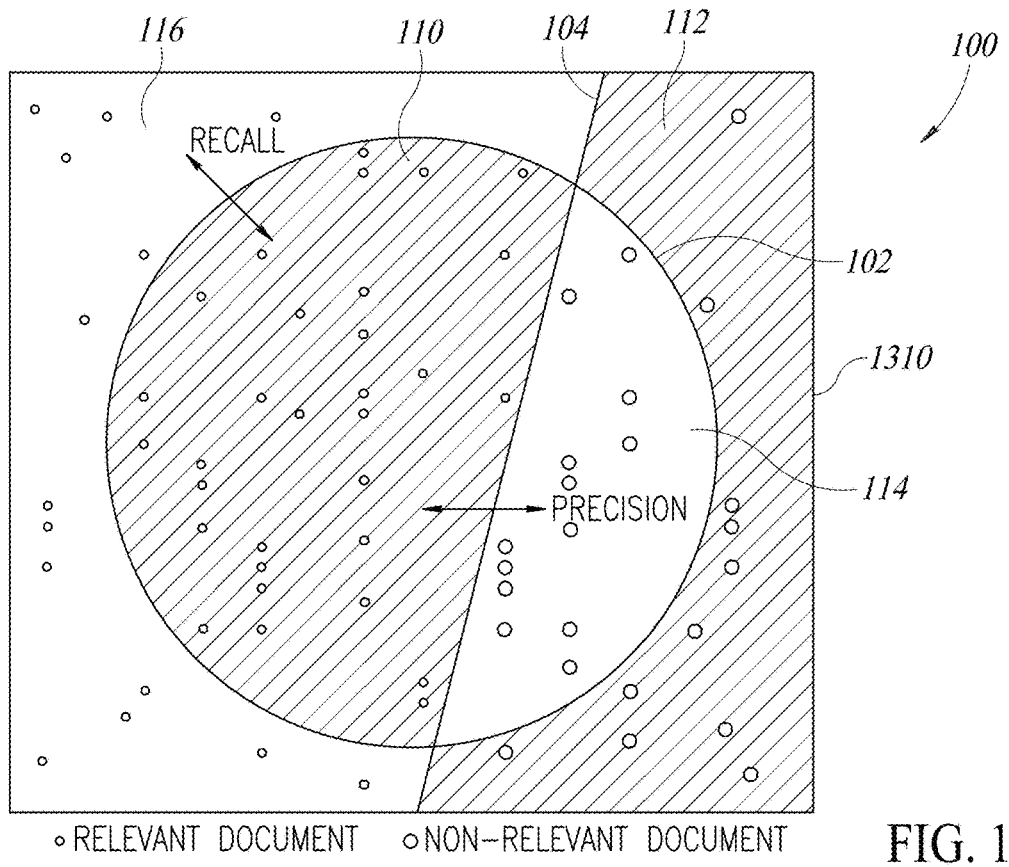
FIG. 1 is a diagram illustrating results obtained from a search performed on a document corpus divided into true positive, true negative, false positive, and false negative values.

FIG. 1 is a visualization 100 of the recall rate and the precision value. In FIG. 1, solid circles and rings represent documents in the corpus 1320. The solid circles represent relevant documents and the rings represent irrelevant or non-relevant documents. A line 104 separates the relevant documents from the non-relevant documents in the corpus

1320. A circle 102 represents search results. The documents counted as True Positives are represented by a shaded area 110 inside the circle 102. The documents counted as True Negatives are represented by a shaded area 112 outside the circle 102. The documents counted as False Positives are represented by an unshaded area 114 inside the circle 102. The documents counted as False Negatives are represented by an unshaded area 116 outside the circle 102.

The recall rate is the True Positives (represented by the shaded area 110) divided by a total of the True Positives and the False Negatives (represented by the shaded area 110 and the unshaded area 116, respectively). Thus, the E-Discovery Platform 1330 calculates the recall rate according to Equation 2 below.

$$\text{Recall} = \frac{T_P}{T_p + F_n} \quad \text{Equation 2}$$

The precision value is the True Positives (represented by the shaded area 110) divided by a total of the True Positives and the False Positives (represented by the shaded area 110 and the unshaded area 114, respectively). Thus, the E-Discovery Platform 1330 calculates the precision value according to Equation 3 below. Using this formula, the precision value equals 1.0 when all relevant documents within the larger document corpus have been identified without generating any false positives, meaning zero documents are within the unshaded area 114.

$$\text{Precision} = \frac{T_P}{T_p + F_p} \quad \text{Equation 3}$$

The $F_1$ Score is twice the product of the recall rate and the precision value divided by a sum of the recall rate and the precision value. Thus, the E-Discovery Platform 1330 calculates the $F_1$ Score according to Equation 4 below.

$$F_1 \text{ Score} = 2 \cdot \frac{\left(\frac{T_P}{T_p + F_n}\right) \cdot \left(\frac{T_P}{T_p + F_P}\right)}{\left(\frac{T_P}{T_p + F_n}\right) + \left(\frac{T_P}{T_p + F_P}\right)} \quad \text{Equation 4}$$

The E-Discovery Platform 1330 may present the recall rate, the precision value, and the $F_1$ Score as numerical values to the user 1312. The method 900 (see FIG. 9) has been shown to deliver higher recall rates, precision values, and $F_1$ Scores than traditional document retrieval approaches that precede human review.

After the method 900 (see FIG. 9) terminates, the human review phase may be performed. As explained above, the method 900 assigns Composite Scores to the documents. The documents may be organized by their Composite Scores into tiers and reviewed starting with the highest tier first. Thus, after completing the human review of the documents in the highest tier, the document review team 1314 begins reviewing the documents in the next highest tier and so forth.

Referring to FIG. 10, during the human review phase, the document review team 1314 uses the Review Platform 1336 to inspect each document and apply final relevance designations to each. In other words, the document review team 1314 inspects each document, which is presented to the user 1312 through the document viewer application 1303.

Description of Results Dashboard

Referring to FIG. 6, the populated dashboard user interface 600 displays or includes links to interactive graphical user interfaces configured to display various types of data. For example, the populated dashboard user interface 600 may display and/or include links one or more of the following:

1.) An interactive graphical user interface (GUI) 610A displaying (e.g., in a chart) each search method with its respective search hit count. This information may be displayed in a pie chart, a histogram, or other graphical or text-based rendering. In FIG. 6, the GUI 610A indicates an exact search found 6,032 hits, a fuzzy search found 6,205 hits, a stemming search found 6,222 hits, a concept search found 1,329 hits, and a cognitive search found 17,140 hits.
2.) The Sankey Chart 610B that displays search results by search method. The user may click on elements of the Sankey Chart 610B to filter the document list. For example, clicking on a portion of the Sankey Chart 610B representing multiple overlapping search streams will automatically filter the document list for those results that were returned by those multiple overlapping search methods. In other words, those documents returned by overlapping streams will be selected as the subset included in the document list.
3.) The timeline chart 700 (see FIG. 7) that plots search results per search method over time. Each search method may be assigned a distinct color, allowing the user to easily identify key timeframes during which a given type of search produced more (or fewer) search results.

Example Implementation

Referring to FIG. 10, the system 1300 includes a client computing device 1302, a server 1306, one or more reviewer computing devices 1307, and a searchable database 1308. The client computing device 1302, the server 1306, the reviewer computing device(s) 1307, and the searchable database 1308 may be connected to one another by a network 1310. In the embodiment illustrated, the server 1306 is implemented as web server configured to execute an application 1305 (e.g., a web application). By way of a non-limiting example, the web server may be implemented using Internet Information Services ("IIS") for Microsoft Windows® Server. In such an embodiment, the application 1305 may be implemented as a web application hosted in IIS. The application 1305 is configured to communicate with the client computing device 1302 and a document viewer application 1303 executing on each of the reviewer computing device(s) 1307. For example, the application 1305 may be configured to communicate with a web browser 1309 executing on the client computing device 1302.

The client computing device 1302 is operated by the operator or the user 1312 and the reviewer computing device(s) 1307 is/are operated by the document review team 1314 (e.g., including one or more attorneys).

The searchable database 1308 executes on a computing device and may be implemented using Microsoft SQL server and/or a similar database program. The searchable database 1308 may execute on the server 1306 or another computing device connected to the server 1306 (e.g., by the network 1310).

The searchable database 1308 stores the corpus 1320 of electronic documents. For each document in the corpus 1320, the searchable database 1308 stores extracted document text 1322 and metadata 1324. For each document, the metadata 1324 stores parameters or field values extracted from or about the document. By way of non-limiting examples, the metadata 1324 may store an "Email From" metadata field 1326, an issues metadata field 1327, a custodian metadata field 1328, a timestamp metadata field 1329, an Author metadata field, a Company metadata field, a Date Sent metadata field, a Date Modified metadata field, a File Type metadata field, an "Email Subject" metadata field, an "Email To" metadata field, an "Email CC" metadata field, an "Email BCC" metadata field, and the like.

The searchable database 1308 is configured to facilitate document retrieval through standard analytical operations and querying methodologies performed against the document text 1322 and the metadata 1324. For example, the searchable database 1308 may implement the E-Discovery Platform 1330 configured to perform document identifying operations (e.g., document retrieval methods, analyses, and the like) on the document text 1322 and/or the metadata 1324. The E-Discovery Platform 1330 may leverage one or more known methods (e.g., document retrieval methods). The E-Discovery Platform 1330 has been described and illustrated as being implemented by the searchable database 1308. However, this is not a requirement. Alternatively, at least a portion of the E-Discovery Platform 1330 may be implemented by the client computing device 1302, the server 1306, and/or another computing device. At least a portion of the E-Discovery Platform 1330 may be implemented using one or more commercially available products.

The searchable database 1308 also stores a document-level Composite Score field 1340 that stores a value for each document. By default, the Composite Score field 1340 may be set equal to zero for all of the documents in the corpus 1320. The searchable database 1308 implements the database engine 1344, which calculates the Composite Scores stored in the Composite Score field 1340 for the electronic documents of the corpus 1320.

The searchable database 1308 implements a Review Platform 1336 configured to communicate with the document viewer application 1303 executing on each of the reviewer computing device(s) 1307. During the human review phase, which of the document review team 1314 uses the document viewer application 1303 to access the Review Platform 1336. The Review Platform 1336 is configured to retrieve and send one or more of the documents to each of the reviewer computing device(s) 1307. The document(s) is/are presented to the document review team 1314 through the document viewer application 1303.

Figure 8:
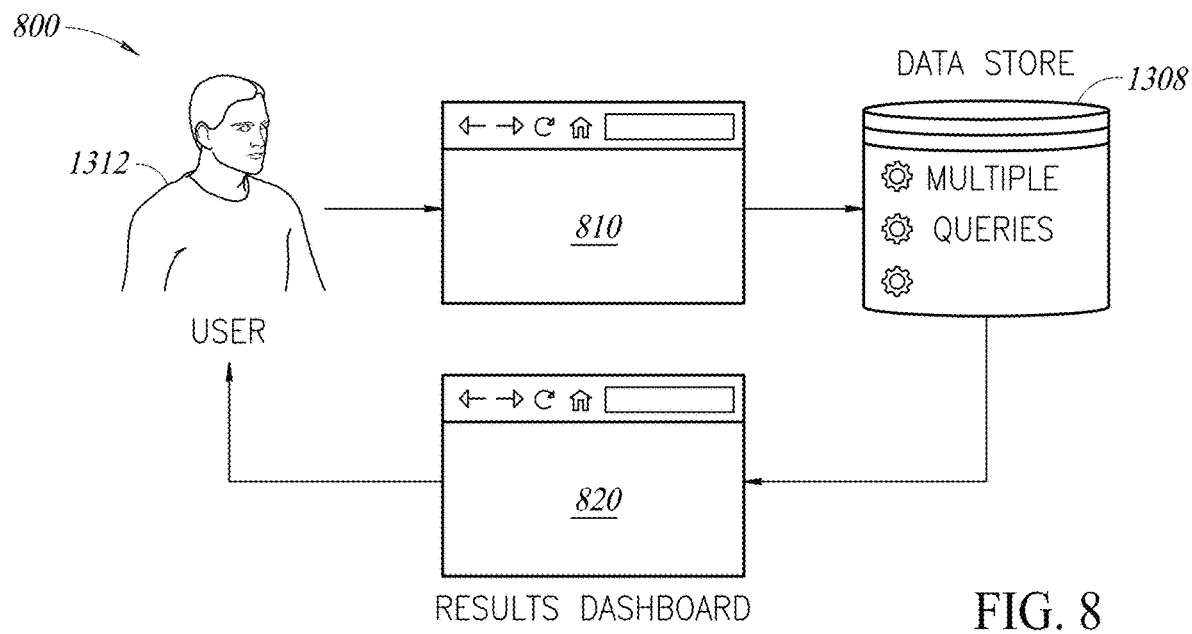
FIG. 8 is a block diagram illustrating an example implementation of a system configured to perform a method of FIG. 9.

FIG. 8 is a block diagram illustrating an example implementation 800 with a web interface (e.g., web pages 810 and 820) hosted in IIS and data stored in a data store or the database 1308 (e.g., Microsoft SQL server). In this example implementation, the application 1305 may call a custom RESTful application programming interface ("API") to input the search term(s) (e.g., a phrase) received from the operator (in block 920 of FIG. 9) into the E-Discovery Platform 1330. The application 1305 may use third party software (e.g., an API) to expand the search term(s), which returns multiple terms called "Cognitive Synonyms." Then the application 1305 creates multiple search objects for each search type and each search term (including both the original and any expanded search term(s)). The application 1305 submits the search objects to the E-Discovery Platform 1330.

The E-Discovery Platform 1330 performs each search (e.g., by executing a search object for each search), populates a database table (e.g., in the Microsoft SQL database) for each search, and ranks the returned search results for each search. The database engine 1344 calculates the Composite Score for each document and creates a composite table by joining the database table for each of the searches together to present a single results table.

The application 1305 may include logic that allows the operator to select one of the search objects and prefers the selected search object's results above the results of another search object allowing the Composite Score to be constructed in different ways to help ensure that the most pertinent results are provided.

Referring to FIG. 8, the user 1312 may run a query or search by entering the search term(s) into the web page 810 and submitting the web page 810 to the application 1305, which runs the search via the RESTful API (e.g., hosted in IIS). This results in multiple searches being performed simultaneously by the E-Discovery Platform 1330.

An action is triggered by the user 1312 that displays a custom web page 820 (e.g., a user interface 300 illustrated in FIG. 3) visualizing the search results obtained from the plurality of search methods along with a Composite Score ranking the search results.

The application 1305 reads its data from the database 1308 (e.g., a Microsoft SQL database).

The results are displayed to the user 1312 through a custom web page (e.g., the populated dashboard user interface 600 illustrated in FIG. 6) allowing the user to visualize the Composite Score results and other analytic dashboards.

Both the web page 810 and the web page 820 may be implemented by the populated dashboard user interface 600 (see FIG. 6).

Each of the components of the system 1300 may be implemented by any combination of hardware, firmware, and/or software.

Computing Device

Figure 11:
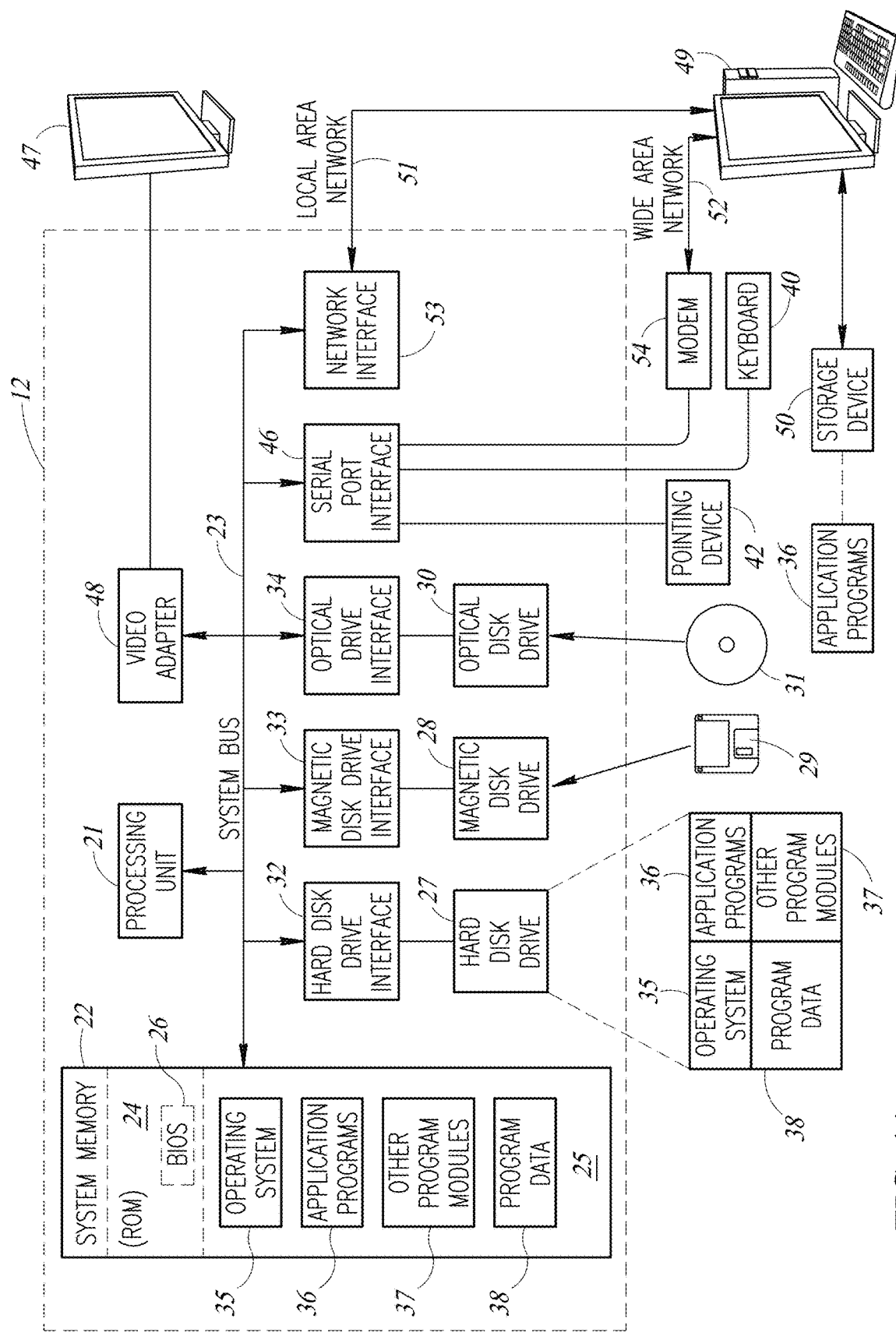
FIG. 11 is a diagram of a hardware environment and an operating environment in which computing devices of the system of FIGS. 8 and 10 may be implemented.

FIG. 11 is a diagram of hardware and an operating environment in conjunction with which implementations of the one or more computing devices of the system 1300 (see FIG. 10) may be practiced. The description of FIG. 11 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 11 includes a general-purpose computing device in the form of the computing device 12. Each of the computing devices of FIG. 10 (including the client computing device 1302, the server 1306, the reviewer computing device(s) 1307, and the searchable database 1308) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 11 include a local-area network (LAN) 51 and a wide-area network (WAN) 52. Such networking environments are commonplace in offices, enterprise-wide computer networks, intranets, and the Internet. The network 1310 (see FIG. 10) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 900 illustrated in FIG. 9) described above. Such instructions may be stored on one or more non-transitory computer-readable media.

In some embodiments, the system memory 22 stores computer executable instructions that when executed by one or more processors cause the one or more processors to generate the visualization 100, the user interface 300, the search configuration user interface 400, the unpopulated dashboard user interface 500, the populated dashboard user interface 600, and the Timeline chart 700 illustrated in FIGS. 1, 3, 4, 5, 6, and 7, respectively, and described above. Such instructions may be stored on one or more non-transitory computer-readable media.

At least one embodiment of the disclosure can be described in view of the following clauses.

1. A system comprising: at least one computing device implementing at least one search platform; a server computing device connected to each of the at least one computing device by a network; and a client computing device connected to the server computing device by the network, the client computing device receiving search criteria from a user, and transmitting the search criteria to the server computing device via the network, the server computing device receiving the search criteria, and instructing the at least one search platform via the network to use the search criteria to perform multiple search operations on a collection of items, and provide results obtained from the multiple search operations to the server computing device via the network, the results comprising a score assigned to each of the items by each of the multiple search operations, the server computing device determining, for each item of a first portion of the items, a composite score based on the score obtained from each of the multiple search operations for the item, the server computing device transmitting a graphical user interface ("GUI") to the client computing device for display thereby, the GUI displaying information related to the composite score determined for each item of at least a second portion of the first portion of the items.
2. The system of clause 1, wherein the GUI displays the information ranked by the composite score determined for each item of the second portion.
3. The system of clauses 1 or 2, wherein the GUI is a first GUI, the information is first information, the server computing device transmits a second GUI to the client computing device for display thereby, the second GUI displays second information related to a first portion of the results, the client computing device receives a user selection of a second portion of the results via the second GUI displayed by the client computing device, and forwards one or more identifications of the second portion of the results to the server computing device, the server computing device selects a particular item for inclusion in a third portion of the items when the particular item has at least one result in the second portion of the results, and the server computing device transmits a third GUI to the client computing device for display thereby, the third GUI displaying third information related to the composite score determined for each item of the third portion of the items.
4. The system of clause 3, wherein the second GUI comprises a Sankey Chart.
5. The system of clauses 3 or 4, wherein the third GUI comprises a list of the third portion of the items.
6. The system of clause 5, wherein the list of the third portion of the items is ranked by the composite score determined for each item of the third portion.
7. The system of any one of the clauses 1-6, wherein the multiple search operations comprise an exact search, a fuzzy search, a stemming search, a conceptual search, and a cognitive search.
8. The system of any one of the clauses 1-7, wherein for each item of the first portion of the items, the server computing device determines the composite score by adding the score obtained from each of the multiple search operations for the item.
9. The system of any one of the clauses 1-8, further comprising: at least one review computing device, the client computing device receiving a user selection of a selected portion of the collection of items and forwarding one or more identifications of the selected portion to the server computing device, the server computing device forwarding information related to the selected portion of the collection of items to the at least one review computing device for review by one or more operators thereof.
10. A method comprising: (a) obtaining results from multiple document identifying operations for a plurality of documents, the results comprising a score assigned to each of the plurality of documents by each of the multiple document identifying operations; (b) assigning a composite score to each document of a first portion of the plurality of documents based at least in part on the score assigned to the document by each of the multiple document identifying operations; and (c) generating a graphical user interface ("GUI") displaying information based on the composite score assigned to each document of at least a second portion of the first portion.
11. The method of clause 10, wherein the GUI is a first GUI, the information is first information, and the method further comprises: (d) displaying a second GUI comprising second information related to a first portion of the results; (e) receiving a user selection of a second portion of the results via the second GUI; (f) selecting a particular document for inclusion in a third portion of the plurality of documents when the particular document has at least one result in the second portion of the results; and (g) displaying a third GUI comprising third information related to the composite score determined for each document of the third portion of the plurality of documents.
12. The method of clause 11, wherein the second GUI comprises a Sankey Chart.
13. The method of any one of the clauses 10-12, further comprising: filtering one or more document from the second portion of the plurality of documents; and updating the GUI to remove a portion of the information that is related to the one or more document.

14. The method of any one of the clauses 10-13, further comprising: ranking the information by the composite score determined for each document of the second portion.
15. The method of any one of the clauses 10-14, further comprising: dividing the plurality of documents into a plurality of groups each corresponding to a different classification; and statistically validating the plurality of groups.
16. The method of clause 15, wherein the plurality of groups comprises a relevant group and an irrelevant group.
17. A graphical user interface ("GUI") generated by a computing device, the GUI comprising: a first portion displaying first information based on a composite score assigned to each document of a first portion of a plurality of documents; and a second portion displaying a visualization of results obtained from multiple document identifying operations performed with respect to the plurality of documents, one or more sub-portions of the second portion being selectable to select a subset of the plurality of documents, selecting the subset updating the first portion to display second information related to the subset, the composite score being calculated for each document of the plurality of documents based on those of the results obtained for the document.
18. The GUI of clause 17, wherein the second portion comprises a Sankey Chart.
19. The GUI of clause 18, wherein the first portion comprises a list of the first portion of the plurality of documents ranked by the composite score assigned to each document of the first portion of the plurality of documents.
20. The GUI of any one of the clauses 17-19, further comprising: a third portion displaying a total number of the results obtained by each of the multiple document identifying operations.
21. The GUI of any one of the clauses 17-20, further comprising: a third portion displaying the results on a timeline.
22. The GUI of any one of the clauses 17-21, further comprising: at least a third portion displaying a plurality of inputs that receive user input used to configure the multiple document identifying operations.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

As used herein, a term joining items in a series (e.g., the term "or," the term "and," or the like) does not apply to the entire series of items, unless specifically stated otherwise or otherwise clearly contradicted by context. For example, the phrase "a plurality of A, B, and C" (with or without the Oxford comma) refers to a subset including at least two of the recited items in the series. Thus, the phrase refers to (1) at least one A and at least one B but not C, (2) at least one A and at least one C but not B, (3) at least one B and at least one C but not A, and (4) at least one A and at least one B and at least one C. Similarly, the phrase "a plurality of A, B, or C" (with or without the Oxford comma) refers to a subset including at least two of the recited items in the series. Thus, this phrase also refers to (1) at least one A and at least one B but not C, (2) at least one A and at least one C but not B, (3) at least one B and at least one C but not A, and (4) at least one A and at least one B and at least one C.

By away of another example, conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A system comprising:
   at least one computing device to implement at least one search platform;
   a server computing device to be connected to each of the at least one computing device by a network; and
   a client computing device to be connected to the server computing device by the network,
   the client computing device to receive search criteria from a user, and transmit the search criteria to the server computing device via the network,
   the server computing device to receive the search criteria, and instruct the at least one search platform via the network to use the search criteria to perform multiple search operations on a collection of items, and provide results obtained from the multiple search operations to the server computing device via the network, the results comprising a score assigned to each of the items by each of the multiple search operations,
   the server computing device to determine, for each item of a first portion of the items, a composite score based on the score obtained from each of the multiple search operations for the item,
   the server computing device to transmit a first graphical user interface ("GUI") to the client computing device for display thereby, the first GUI to display first information related to the composite score determined for each item of at least a second portion of the first portion of the items,
   the server computing device to transmit a second GUI to the client computing device for display thereby, the second GUI to comprise a Sankey Chart and display second information related to a first portion of the results,
   the client computing device to receive a user selection of a second portion of the results via the second GUI to be displayed by the client computing device, and forward one or more identifications of the second portion of the results to the server computing device,
   the server computing device to select a particular item for inclusion in a third portion of the items when the particular item has at least one result in the second portion of the results, and
   the server computing device to transmit a third GUI to the client computing device for display thereby, the third GUI to display third information related to the composite score determined for each item of the third portion of the items.

2. The system of claim 1, wherein the first GUI is to display the first information ranked by the composite score to be determined for each item of the second portion.

3. The system of claim 1, wherein the Sankey Chart is to display at least a portion of the second information.

4. The system of claim 1, wherein the third GUI is to comprise a list of the third portion of the items.

5. The system of claim 4, wherein the list of the third portion of the items is to be ranked by the composite score to be determined for each item of the third portion.

6. The system of claim 1, wherein the multiple search operations are to comprise an exact search, a fuzzy search, a stemming search, a conceptual search, and a cognitive search.

7. The system of claim 1, wherein for each item of the first portion of the items, the server computing device is to determine the composite score by adding the score obtained from each of the multiple search operations for the item.

8. The system of claim 1, further comprising:
   at least one review computing device, the client computing device to receive a user selection of a selected portion of the collection of items and forward one or more identifications of the selected portion to the server computing device, the server computing device to forward fourth information related to the selected portion of the collection of items to the at least one review computing device for review by one or more operators thereof.

9. A method comprising:
   obtaining results from multiple document identifying operations for a plurality of documents, the results comprising a score assigned to each of the plurality of documents by each of the multiple document identifying operations;
   assigning a composite score to each document of a first portion of the plurality of documents based at least in part on the score assigned to the document by each of the multiple document identifying operations;
   generating a first graphical user interface ("GUI") displaying first information based on the composite score assigned to each document of at least a second portion of the first portion;
   displaying a second GUI comprising a Sankey Chart and second information related to a first portion of the results;
   receiving a user selection of a second portion of the results via the second GUI;
   selecting a particular document for inclusion in a third portion of the plurality of documents when the particular document has at least one result in the second portion of the results; and
   displaying a third GUI comprising third information related to the composite score determined for each document of the third portion of the plurality of documents.

10. The method of claim 9, wherein the Sankey Chart displays at least a portion of the second information.

11. The method of claim 9, further comprising:
    filtering one or more document from the second portion of the plurality of documents; and
    updating the first GUI to remove a portion of the first information that is related to the one or more document.

12. The method of claim 9, further comprising:
    ranking the first information by the composite score determined for each document of the second portion.

13. The method of claim 9, further comprising:
    dividing the plurality of documents into a plurality of groups each corresponding to a different classification; and
    statistically validating the plurality of groups.

14. The method of claim 13, wherein the plurality of groups comprises a relevant group and an irrelevant group.

15. A computing system comprising:
    one or more processors; and
    memory storing instructions that, if executed by the one or more processors, cause the computing system to display a graphical user interface ("GUI") comprising:

a first portion to display first information based on a composite score assigned to each document of a first portion of a plurality of documents; and a second portion to display a visualization of results obtained from multiple document identifying operations performed with respect to the plurality of documents, the second portion to comprise a Sankey Chart, one or more sub-portions of the second portion to be selectable to select a subset of the plurality of documents, selecting the subset to update the first portion to display second information related to the subset, the composite score to be calculated for each document of the plurality of documents based on those of the results obtained for the document.

16. The computing system of claim 15, wherein the Sankey Chart is to comprise the one or more sub-portions.

17. The computing system of claim 16, wherein the first portion is to comprise a list of the first portion of the plurality of documents ranked by the composite score assigned to each document of the first portion of the plurality of documents.

18. The computing system of claim 15, wherein the GUI further comprises:
a third portion to display a total number of the results obtained by each of the multiple document identifying operations.

19. The computing system of claim 15, wherein the GUI further comprises:
a third portion to display the results on a timeline.

20. The computing system of claim 15, wherein the GUI further comprises:
at least a third portion to display a plurality of inputs that receive user input used to configure the multiple document identifying operations.

21. A system comprising: one or more processors to be connected to a client computing device and at least one computing device implementing at least one search platform, the one or more processors to:
receive results from the at least one search platform obtained from multiple search operations performed on a collection of items, the results comprising a score assigned to each of the items by each of the multiple search operations,
determine, for each item of a first portion of the items, a composite score based on the score obtained from each of the multiple search operations for the item,
transmit a first graphical user interface ("GUI") to the client computing device for display thereby, the first GUI to display first information related to the composite score determined for each item of at least a second portion of the first portion of the items,
transmit a second GUI to the client computing device for display thereby, the second GUI to comprise a Sankey Chart and display second information related to a first portion of the results,
receive one or more identifications of a second portion of the results from the client computing device, the client computing device having received a selection of the second portion of the results via the second GUI,
select a particular item for inclusion in a third portion of the items when the particular item has at least one result in the second portion of the results, and
transmit a third GUI to the client computing device for display thereby, the third GUI to display third information related to the composite score determined for each item of the third portion of the items.

22. The system of claim 21, wherein the third GUI is to comprise a list of the third portion of the items.

23. The system of claim 22, wherein the list of the third portion of the items is to be ranked by the composite score to be determined for each item of the third portion.

24. The system of claim 21, wherein the one or more processors are to receive search criteria from the client computing device, and
before receiving the results from the at least one search platform, instruct the at least one search platform to use the search criteria to perform the multiple search operations on the collection of items.

25. The system of claim 21, wherein the first GUI
is to display the first information ranked by the composite score to be determined for each item of the second portion.

26. The system of claim 21, wherein the Sankey Chart is to display at least a portion of the second information.

27. The system of claim 21, wherein for each item of the first portion of the items, the one or more processors are to determine the composite score by adding the score obtained from each of the multiple search operations for the item.

28. The system of claim 21, wherein the one or more processors are to:
receive one or more identifications of a selected portion of the collection of items from the client computing device, which received a user selection of the selected portion of the collection of items, and
forward fourth information related to the selected portion of the collection of items to at least one review computing device for review by one or more operators thereof.

29. A system comprising: one or more processors to be connected to a client computing device and at least one computing device implementing at least one search platform, the one or more processors to:
receive results from the at least one search platform obtained from multiple search operations performed on a collection of items, the results comprising a score assigned to each of the items by each of the multiple search operations,
determine, for each item of a first portion of the items, a composite score based on the score obtained from each of the multiple search operations for the item,
transmit a first graphical user interface ("GUI") to the client computing device for display thereby, the first GUI to display first information related to the composite score determined for each item of at least a second portion of the first portion of the items,
transmit a second GUI to the client computing device for display thereby, the second GUI to comprise a Sankey Chart and display second information related to a first portion of the results,
receive one or more identifications of a selected portion of the collection of items from the client computing device, which received a user selection of the selected portion of the collection of items, and
forward fourth information related to the selected portion of the collection of items to at least one review computing device for review by one or more operators thereof.

30. The system of claim 29, wherein the one or more processors are to:
receive one or more identifications of a second portion of the results from the client computing device, the client computing device having received a selection of the second portion of the results via the second GUI, select a particular item for inclusion in a third portion of the items when the particular item has at least one result in the second portion of the results, and transmit a third GUI comprising a list of the third portion of the items to the client computing device for display thereby, the third GUI to display third information related to the composite score determined for each item of the third portion of the items.

31. The system of claim 30, wherein the list of the third portion of the items is to be ranked by the composite score to be determined for each item of the third portion.

32. The system of claim 29, wherein the one or more processors are to receive search criteria from the client computing device, and before receiving the results from the at least one search platform, instruct the at least one search platform to use the search criteria to perform the multiple search operations on the collection of items.

33. The system of claim 29, wherein the first GUI is to display the first information ranked by the composite score to be determined for each item of the second portion.

34. The system of claim 29, wherein the Sankey Chart is to display at least a portion of the second information.

35. The system of claim 29, wherein for each item of the first portion of the items, the one or more processors are to determine the composite score by adding the score obtained from each of the multiple search operations for the item.

* * * * *